United States Patent
Heo et al.

(10) Patent No.: US 11,215,094 B2
(45) Date of Patent: Jan. 4, 2022

(54) SOOTY SMOKE FILTER REGENERATION CONTROL SYSTEM AND METHOD FOR HYBRID VEHICLE

(71) Applicants: HYUNDAI MOTOR COMPANY, Seoul (KR); KIA MOTORS CORPORATION, Seoul (KR)

(72) Inventors: Yun Chan Heo, Seoul (KR); Sang Yoon Shin, Seoul (KR); Jae Yui Kim, Seoul (KR); Hyun Mo Ahn, Seoul (KR); Min Kyu Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 127 days.

(21) Appl. No.: 16/416,084

(22) Filed: May 17, 2019

(65) Prior Publication Data
US 2020/0182112 A1    Jun. 11, 2020

(30) Foreign Application Priority Data
Dec. 6, 2018   (KR) .................. 10-2018-0156085

(51) Int. Cl.
*F01N 3/023* (2006.01)
*F01N 9/00* (2006.01)
*F02D 41/02* (2006.01)

(52) U.S. Cl.
CPC ............ *F01N 3/023* (2013.01); *F01N 9/002* (2013.01); *F02D 41/029* (2013.01)

(58) Field of Classification Search
CPC ........ F01N 3/023; F01N 9/002; F02D 41/029; F02B 33/44
See application file for complete search history.

(56) References Cited

U.S. PATENT DOCUMENTS

| | | | | |
|---|---|---|---|---|
| 8,392,091 | B2* | 3/2013 | Hebbale | F01N 9/00 701/102 |
| 2007/0126236 | A1* | 6/2007 | Tamura | H02J 7/1423 290/40 C |
| 2012/0216509 | A1* | 8/2012 | Sujan | F01N 3/0232 60/274 |

(Continued)

FOREIGN PATENT DOCUMENTS

KR   10-2018-0101011 A   9/2018

*Primary Examiner* — Ngoc T Nguyen
(74) *Attorney, Agent, or Firm* — Lempia Summerfield Katz LLC

(57) ABSTRACT

A sooty smoke filter regeneration control system of a hybrid vehicle, includes an engine, a sooty smoke filter installed in an exhaust line through which exhaust gas from the engine passes, and filtering out sooty smoke included in the exhaust gas; a temperature sensor installed in the front end of the sooty smoke filter, and measuring a temperature of exhaust gas flowing into the front end of the sooty smoke filter; an engine controller controlling a temperature of exhaust gas flowing into the sooty smoke filter and to control fuel injection of the engine, based on information associated with a grade of a road on which a vehicle is to drive; and a hybrid control unit controlling an engine clutch disposed between the engine and a motor that assists the engine in association with engine output, in response to a request from the engine controller.

7 Claims, 2 Drawing Sheets

(56) References Cited

U.S. PATENT DOCUMENTS

| | | | |
|---|---|---|---|
| 2016/0123200 A1* | 5/2016 | Ramappan | F02D 37/02 60/285 |
| 2017/0356369 A1* | 12/2017 | Doering | F02D 13/04 |
| 2019/0145359 A1* | 5/2019 | Quix | F02M 26/17 123/568.12 |
| 2019/0168753 A1* | 6/2019 | Borhan | F02D 29/02 |
| 2019/0203630 A1* | 7/2019 | Dudar | F02B 25/145 |

\* cited by examiner

SOOTY SMOKE FILTER REGENERATION CONTROL SYSTEM AND METHOD FOR HYBRID VEHICLE

CROSS REFERENCE TO RELATED APPLICATION

The present application claims priority to Korean Patent Application No. 10-2018-0156085, filed Dec. 6, 2018, the entire contents of which is incorporated herein for all purposes by this reference.

BACKGROUND

1. Field

The present disclosure relates to a sooty smoke filter regeneration control system and method for a hybrid vehicle.

2. Description of the Related Technology

Various hazardous substances are included in exhaust gas emitted from a vehicle engine after combustion, and the amount of exhaust gas emission is restricted by various regulations. In order to cope with the regulations on particulate matter, which is one of the various hazardous substances, a technology is being developed that applies a gasoline particulate filter (GPF) to a vehicle so as to physically collect particulate matter emitted from the engine.

SUMMARY

One aspect of the invention provides a sooty smoke filter regeneration control system and method for a hybrid vehicle, by which a hybrid vehicle equipped with a sooty smoke filter (e.g., a gasoline particulate filter (GPF)) increases regeneration efficiency of a sooty smoke filter and improves the overall fuel efficiency of the vehicle via coordinated control between an engine controller and a hybrid control unit based on information associated with a road on which the vehicle is to drive.

In accordance with an aspect of the present disclosure, a sooty smoke filter regeneration control system of a hybrid vehicle includes: an engine; a sooty smoke filter installed in an exhaust line through which exhaust gas from the engine passes, and configured to filter out sooty smoke included in the exhaust gas; a temperature sensor installed in the front end of the sooty smoke filter, and configured to measure the temperature of exhaust gas flowing into the front end of the sooty smoke filter; an engine controller configured to control the temperature of exhaust gas flowing into the sooty smoke filter and to control fuel injection of the engine, according to information associated with a grade of a road on which a vehicle is to drive; and a hybrid control unit (HCU) configured to control an engine clutch disposed between the engine and a motor that assists the engine in association with engine output, in response to a request from the engine controller.

The regeneration control system may further include a storage unit storing map information including road grade information, reference deposit amount information used for determining whether the amount of soot deposited in the sooty smoke filter is excessive, and minimum reference temperature information which is needed in order to regenerate the sooty smoke filter.

When the amount of soot deposited in the sooty smoke filter is greater than a reference deposit amount stored in the storage unit, the HCU may determine whether the road on which the vehicle is to drive includes a downhill section based on the map information stored in the storage unit.

When the downhill section is included in the road on which the vehicle is to drive, the HCU may control the engine using the engine controller while the vehicle drives on an uphill section, so as to increase the temperature of exhaust gas flowing into the sooty smoke filter to be higher than a reference temperature.

When the vehicle drives on the downhill section, the engine controller may request the HCU to perform lock-up of the engine clutch and fuel-cut.

The HCU may perform lock-up of the engine clutch, and may enable the engine controller to perform fuel-cut, in response to the request of the engine controller.

In accordance with another aspect of the present disclosure, a sooty smoke filter regeneration control method of a hybrid vehicle using a sooty smoke filter regeneration control system of the hybrid vehicle according to the present disclosure may include: comparing the amount of soot deposited in a sooty smoke filter with a reference deposit amount; determining whether a downhill section is included in a road on which a vehicle is to drive when the amount of soot deposited is greater than or equal to the reference deposit amount; when a downhill section is included in the road on which the vehicle is to drive, controlling an engine while the vehicle drives on an uphill section, so as to increase the temperature of exhaust gas flowing into the sooty smoke filter to be greater than or equal to a reference temperature; requesting lock-up of an engine clutch and fuel-cut when the vehicle drives on a downhill section; and performing lock-up of the engine clutch and fuel-cut.

After the determining of whether a downhill section is included in the road on which the vehicle is to drive, the method may further include: measuring the temperature of exhaust gas flowing into the sooty smoke filter; and when the measured temperature of the exhaust gas is less than or equal to a reference temperature previously stored in the storage unit, increasing the temperature of the exhaust gas.

The reference deposit amount may be information used for determining whether the amount of soot deposited in the sooty smoke filter is excessive, and the reference temperature may be the minimum reference temperature that is needed in order to regenerate the sooty smoke filter.

According to the present disclosure, a hybrid vehicle equipped with a sooty smoke filter (e.g., a gasoline particulate filter (GPF)) increases regeneration efficiency of a GPF and improves the overall fuel efficiency of the vehicle via coordinated control between an engine controller and a hybrid control unit based on information associated with a road on which the vehicle is to drive.

Another aspect of the invention provides a hybrid vehicle comprising a sooty smoke filter regeneration system. The hybrid vehicle comprises an engine; a sooty smoke filter installed in an exhaust line through which exhaust gas emitted from the engine passes, and configured to filter out sooty smoke included in the exhaust gas; a temperature sensor installed in a front end of the sooty smoke filter, and configured to measure a temperature of exhaust gas flowing into the front end of the sooty smoke filter; an engine controller configured to control a temperature of exhaust gas flowing into the sooty smoke filter and to control fuel injection of the engine, according to information associated with a grade of a road on which the vehicle is to drive; and a hybrid control unit (HCU) configured to control an engine clutch disposed between the engine and a motor that assists the engine in association with engine output, in response to a request from the engine controller.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF EMBODIMENTS

Embodiments of the invention are now described with reference to the accompanying drawings. The terminology used in the description presented herein is not intended to be interpreted in any limited or restrictive manner, simply because it is being utilized in conjunction with a detailed description of embodiments of the invention.

A gasoline particulate filter (GPF) is used in a vehicle so as to physically collect particulate matter emitted from the engine. The gasoline particulate filter is provided for filtering out particulate matter of the hazardous substances emitted from a vehicle and for responding to enforced regulations on exhaust gas emission that have been recently issued in Europe and China.

Particularly, soot is inevitably deposited in the gasoline particulate filter while the filter filters out particulate matter. When the amount of soot deposited is greater than or equal to a predetermined amount of soot, it may be a factor that increases the exhaust pressure of a vehicle and deteriorates the performance of an engine, and may destroy the gasoline particulate filter depending on the case. Accordingly, an engine controller needs to perform control associated with regeneration of the gasoline particulate filter by burning the soot deposited in the gasoline particulate filter.

In order to regenerate the gasoline particulate filter, the temperature of the gasoline particulate filter needs to be increased to be greater than or equal to a predetermined temperature such that the soot deposited in the gasoline particulate filter is burned, and oxygen needs to be provided to exhaust gas via lean burn such that soot is burned slowly. However, in the case of lean burn for the regeneration of the gasoline particulate filter, roughness of the engine may deteriorate due to the lean burn compared to the theoretical air-fuel ratio, and the reliability and running performance of the vehicle may deteriorate.

Figure 1:
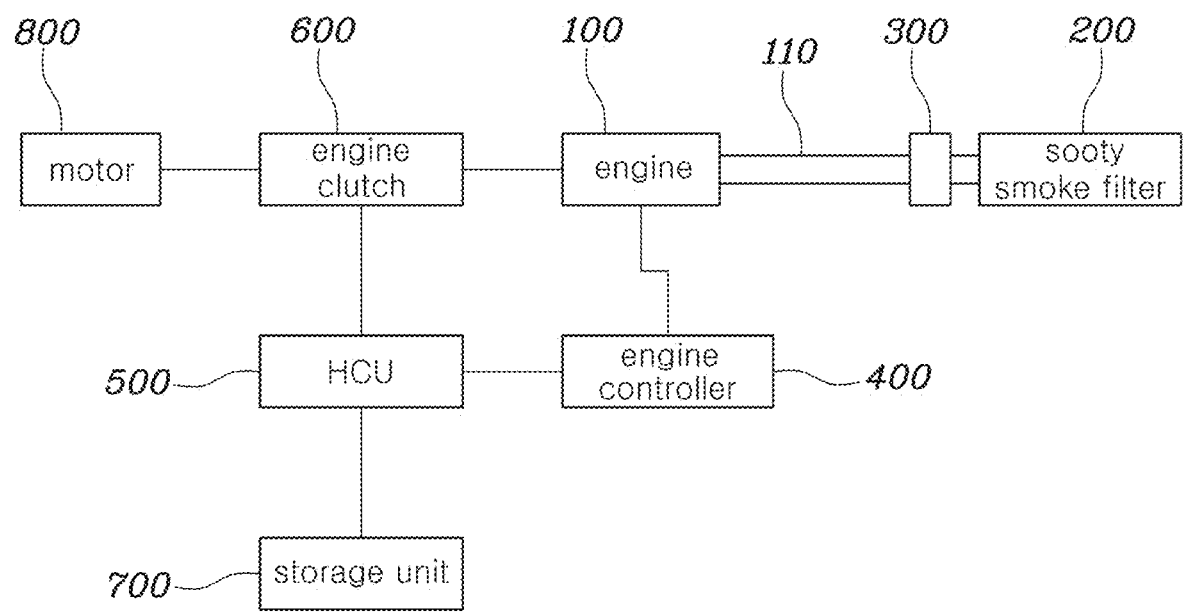
FIG. 1 is a diagram schematically illustrating the configuration of a sooty smoke filter regeneration control system of a hybrid vehicle according to the present disclosure.

FIG. 1 is a diagram schematically illustrating the configuration of a hybrid vehicle having a sooty smoke filter regeneration control system according to embodiments of the present disclosure. As illustrated in FIG. 1, a hybrid vehicle including a sooty smoke filter regeneration control system according to an embodiment of the present disclosure may include: an engine 100; a sooty smoke filter 200 installed in an exhaust line 110 through which exhaust gas emitted from the engine 100 passes, and configured to filter out sooty smoke included in the exhaust gas; a temperature sensor 300 installed in the front end of the sooty smoke filter 200, and configured to measure or detect the temperature of exhaust gas flowing into the front end of the sooty smoke filter 200; an engine controller 400 configured to control the fuel injection of the engine to change the temperature of exhaust gas flowing into the sooty smoke filter based on information associated with a grade of a road on which a vehicle is to drive; and a hybrid control unit (HCU) 500 configured to control an engine clutch 600 disposed between the engine 100 and a motor 800 that assists the engine in association with engine output, in response to a request from the engine controller 400.

The output of the engine 100 is controlled by the engine controller 400 that is controlled by the hybrid control unit 500 which is an upper controller, and the amount of intake air may be controlled via an electric throttle control (ETC). In embodiments, the engine 100 may be a gasoline engine, and may burn fuel and air so as to convert chemical energy into mechanical energy. In embodiments, the engine 100 may include a plurality of cylinders which fuel and air flow into, and an ignition device to ignite the fuel and air which flow into the cylinders. Also, the engine 100 may be connected to an intake manifold so as to receive air flowing into a cylinder, and may expel exhaust gas generated during a combustion process to an exhaust manifold so as to emit the exhaust gas outside a vehicle along the exhaust line 110. Furthermore, the engine 100 may include an injector that injects fuel to flow into a cylinder.

The sooty smoke filter 200 is installed in the exhaust line 100 through which exhaust gas emitted from the engine passes, and may filter out sooty smoke included in the exhaust gas. Here, the sooty smoke filter 200 may be a gasoline particulate filter (GPF). Furthermore, the sooty smoke filter 200 may collect and filter out particulate matter included in the exhaust gas.

In embodiments, the temperature sensor 300 is installed in the front end of or upstream of the sooty smoke filter, but not limited thereto, and may measure the temperature of exhaust gas flowing into the front end of the sooty smoke filter. Here, the temperature of the exhaust gas flowing into the front end of the sooty smoke filter 200, which is measured by the temperature sensor 300, may indicate the temperature of the front end of the sooty smoke filter 200. Also, the temperature information of the exhaust gas flowing into the front end of the sooty smoke filter 200, which is measured by the temperature sensor 300, may be transferred to the engine controller 400. The engine controller 400 may determine whether to increase the temperature of the exhaust gas emitted from the engine 100, on the basis of the temperature information transferred from the temperature sensor 300.

The engine controller 400 may control the temperature of exhaust gas flowing into the sooty smoke filter and fuel-injection of the engine based on road grade information of a road on which the vehicle is to drive. The engine controller 400 may compare the amount of soot deposited in the sooty smoke filter 200 with a reference deposit amount stored in a storage unit 700 which will be described later. Here, the amount of soot deposited in the sooty smoke filter 200 may be calculated in various methods. According to an embodiment, the amount of soot deposited in the sooty smoke filter 200 may be calculated by modeling the amount of soot emitted from the engine based on a driving condition of the vehicle. In this instance, information associated with the amount of soot emitted from the engine based on the driving condition of the vehicle may be stored in the storage unit 700. Also, according to another embodiment, the amount of soot deposited inside the sooty smoke filter 200 may be calculated using the difference in pressure between the inlet and the outlet of the sooty smoke filter 200.

The hybrid control unit 500, which will be described later, may receive map information including road grade information stored in the storage unit 700, and may determine whether a downhill section is included in a road on which the vehicle is to drive based on the corresponding information. In this instance, the hybrid control unit 500 may compare a driving route of a user which is input into a navigation device and the map information previously stored in the storage unit 700, and may determine whether a downhill section is included in the route on which the vehicle is to drive.

Also, when it is determined that a downhill section is included in the road on which the vehicle is to drive, the hybrid control unit 500 may control the engine 100 using the engine controller 400 while the vehicle drives on an uphill section, so as to increase the temperature of exhaust gas flowing into the sooty smoke filter 200 to be greater than or equal to a reference temperature stored in the storage unit 700, before the vehicle arrives at the downhill section. Particularly, when it is determined that a downhill section is included in the road on which the vehicle drives, the hybrid control unit 500 compares the temperature of exhaust gas flowing into the sooty smoke filter 200, which is transferred from the temperature sensor 300, with the reference temperature previously stored in the storage unit 700, and when the temperature is less than or equal to the reference temperature, the hybrid control unit 500 may control the engine controller 400 so as to increase the temperature of exhaust gas emitted from the engine 100 to be greater than or equal to the reference temperature. In embodiments, the reference temperature may be the minimum temperature which is needed in order to regenerate the sooty smoke filter 200. According to an embodiment, the reference temperature may be 550 degrees Celsius. In embodiments, the temperature of the sooty smoke filter 200 is required to be greater than or equal to a predetermined temperature in order to burn the soot deposited in the sooty smoke filter 200 for regeneration. When the temperature of exhaust gas, which is measured and transferred from the temperature sensor 300, is less than or equal to the reference temperature, the engine controller 400 may control the engine 100 so as to increase the temperature of exhaust gas emitted from the engine to be greater than or equal to the reference temperature. In this instance, according to an embodiment, the engine controller 400 may increase the temperature of the exhaust gas emitted from the engine using post-fuel-injection.

Furthermore, when the vehicle drives on an uphill section and then drives on a downhill section, the engine controller 400 may transfer a signal for requesting lock-up of the engine clutch 600 and fuel-cut to the hybrid control unit 500.

The hybrid control unit 500 may control the engine clutch 600 disposed between the engine 100 and the motor 800 that assists the engine 100 in association with engine output, in response to the request from the engine controller 400. More particularly, in the case in which the vehicle drives on a downhill section, when the hybrid controller 500 receives the request for lock-up of the engine clutch 600 from the engine controller 400, the hybrid control unit 500 may perform control such that the engine clutch 600 locks up. Also, when the hybrid control unit 500 receives a fuel-cut request signal from the engine controller 400, the hybrid control unit 500 may transfer a fuel-cut allowing signal to the engine controller 400 such that the engine controller 400 performs fuel-cut. As described above, when the vehicle drives on a downhill section, the vehicle may lock up the engine clutch 600 using the hybrid control unit 500, and may perform fuel-cut using the engine controller 400, whereby the engine runs using the inertia of the vehicle. Accordingly, air including oxygen flows into and is emitted via the exhaust line, and oxygen may be supplied to the sooty smoke filter 200.

The engine clutch 600 is disposed between the engine 100 and the motor 800 that assists the engine in association with engine output, and may calculate the sum of the output torque of the engine 100 and output torque of the motor 800 in a hybrid mode, and may provide the sum to a transmission. In embodiments, the motor 800 may drive by the voltage of a battery which is provided via an inverter.

The storage unit 700 may store map information including road grade information, reference deposit amount information used for determining whether the amount of soot deposited in the sooty smoke filter 200 is excessive, and the minimum reference temperature information that is required in order to regenerate the sooty smoke filter 200.

In order to remove the deposited soot for regeneration of the sooty smoke filter 200, the temperature of the sooty smoke filter 200 needs to be greater than or equal to a predetermined temperature, and oxygen needs to be included in gas that passes through the sooty smoke filter 200. According to the present disclosure, when a downhill section is included in a route on which the vehicle is to drive, the coordinated control between the hybrid control unit 500 and the engine controller 400 may increase the temperature of exhaust gas flowing into the sooty smoke filter 200 to be greater than or equal to the reference temperature, while the vehicle drives on an uphill section, and when the vehicle drives on the downhill section, the hybrid control unit 500 may perform control such that the engine clutch 600 locks up and fuel-cut is performed, whereby oxygen is provided to the sooty smoke filter 200. Accordingly, there is no need to perform control separately, which runs the engine using the motor so as to forcibly cut the fuel, whereby the overall fuel efficiency may be improved.

Figure 2:
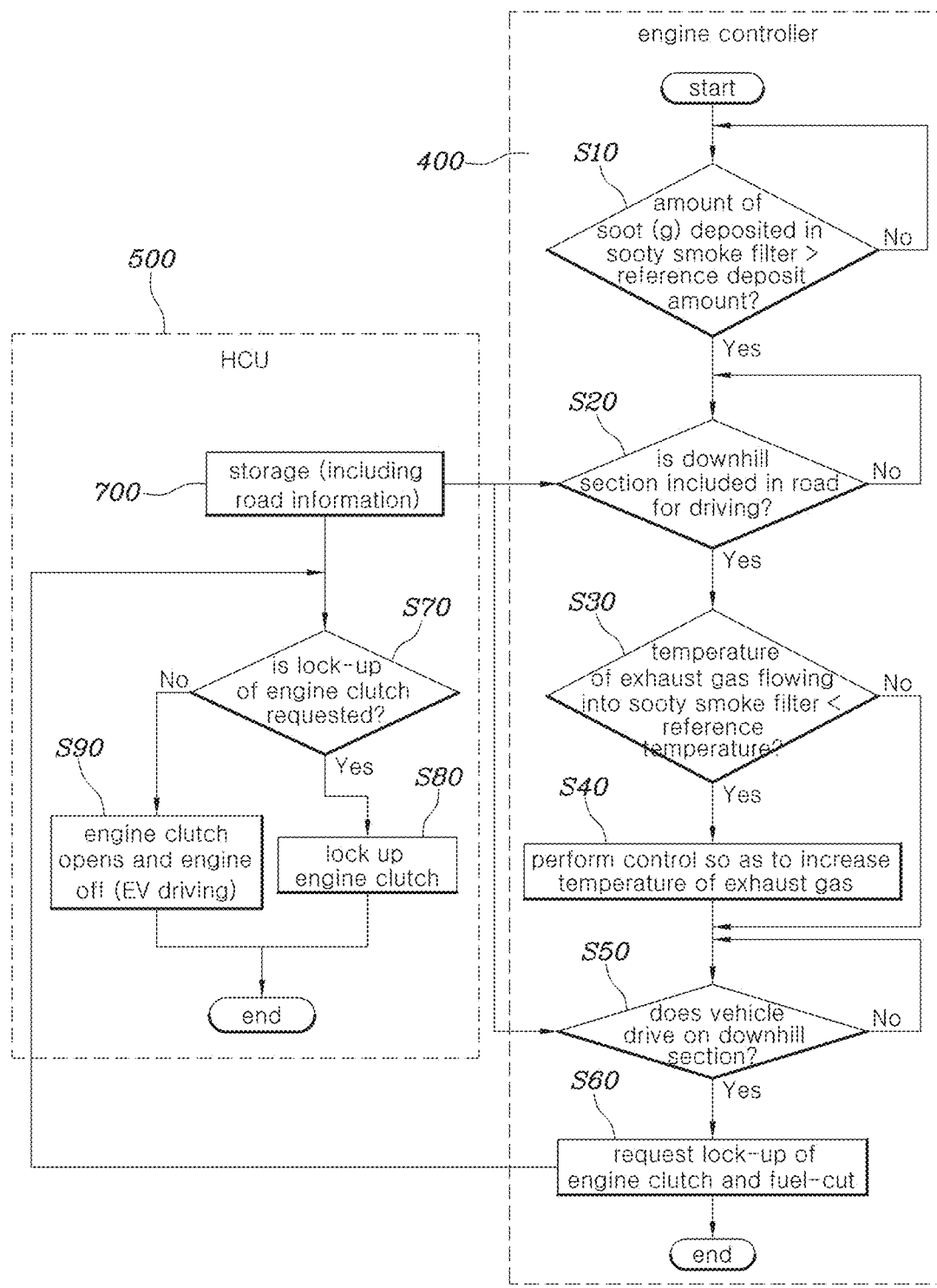
FIG. 2 is a flowchart illustrating a sooty smoke filter regeneration control method of a hybrid vehicle according to the present disclosure.

FIG. 2 is a flowchart illustrating a sooty smoke filter regeneration control method of a hybrid vehicle according to the present disclosure. Referring to FIG. 2, a sooty smoke filter regeneration control method of a hybrid vehicle according to the present disclosure may include an operation of comparing the amount of soot deposited in a sooty smoke filter with a reference deposit amount, an operation of determining whether a downhill section is included in a road on which a vehicle is to drive when the amount of soot deposited is greater than or equal to the reference deposit amount, an operation of controlling an engine while the vehicle drives on an uphill section, so as to increase the temperature of exhaust gas flowing into the sooty smoke filter to be greater than a reference temperature when it is determined that a downhill section exists in the road on which the vehicle is to drive, an operation of requesting lock-up of an engine clutch and fuel-cut when the vehicle drives on the downhill section, and an operation of performing lock-up of the engine clutch and fuel-cut. Also, after the operation of determining whether a downhill section is included in the road on which the vehicle is to drive, the sooty smoke filter regeneration control method may further include an operation of measuring the temperature of exhaust gas flowing into the sooty smoke filter, and increasing the temperature of the exhaust gas when the measured temperature of the exhaust gas is less than or equal to the reference temperature previously stored in the storage unit.

Also, when lock-up of the engine clutch is not performed, the engine clutch may be open and the vehicle may drive in an electric motor vehicle mode.

In the operation of comparing the amount of soot deposited in the sooty smoke filter with the reference deposit amount, the reference deposit amount may be information used for determining whether the amount of soot deposited in the sooty smoke filter is excessive. Also, in the operation of comparing the temperature of the exhaust gas flowing into the sooty smoke filter with the reference temperature stored in the storage unit, the reference temperature may be the minimum reference temperature that is required in order to regenerate the sooty smoke filter.

Detailed technical features of respective operations of the sooty smoke filter regeneration control method of a hybrid vehicle according to the present disclosure are the same as the technical features of respective elements of the sooty smoke filter regeneration control system of the hybrid vehicle according to the present disclosure which has been described, and thus, detailed descriptions thereof will be omitted.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the invention have been described above, those skilled in the art may understand that configurations of the various embodiments described above may be changed without departing from the spirit of the invention. It will be also understood that the changes fall within the scope of the invention.

What is claimed is:

1. A hybrid vehicle with a sooty smoke filter regeneration control system, the hybrid vehicle comprising:
    an engine;
    a sooty smoke filter installed in an exhaust line through which exhaust gas emitted from the engine passes, and configured to filter out sooty smoke included in the exhaust gas;
    a temperature sensor installed in a front end of the sooty smoke filter, and configured to measure a temperature of exhaust gas glowing into the front end of the sooty smoke filter;
    an engine controller configured to control the temperature of exhaust gas flowing into the sooty smoke filter based on information associated with a grade of a road on which the vehicle is to drive, and to control fuel injection of the engine based on the information associated with the grade of the road on which the vehicle is to drive;
    a hybrid control unit (HCU) configured to control an engine clutch disposed between the engine and a motor that assists the engine in association with engine output, in response to a request from the engine controller; and
    a storage unit configured to store map information including road grade information, information indicative of a reference deposit amount to be used for determining whether an amount of soot deposited in the sooty smoke filter is greater than a predetermined amount of soot, and information indicative of a minimum reference temperature at which the sooty smoke filter is regenerated,
    wherein, when the amount of soot deposited in the sooty smoke filter is greater than the reference deposit amount stored in the storage unit, the HCU is configured to determine whether the road on which the vehicle is to drive includes a downhill section based on the map information stored in the storage unit.

2. The regeneration control system of claim 1, wherein, when the downhill section is included in the road on which the vehicle is to drive, the HCU is configured to control the engine using the engine controller while the vehicle drives on an uphill section, so as to increase the temperature of exhaust gas flowing into the sooty smoke filter to be higher than the minimum reference temperature.

3. The regeneration control system of claim 2, wherein, when the vehicle drives on the downhill section, the engine controller is configured to request the HCU to perform lock-up of the engine clutch and fuel-cut.

4. The regeneration control system of claim 3, wherein the HCU is configured to perform lock-up of the engine clutch, and enables the engine controller to perform fuel-cut, in response to the request of the engine controller.

5. A method of regenerating a sooty smoke filter of a sooty smoke filter regeneration control system of a hybrid vehicle, the method comprising:
    detecting an amount of soot deposited in the sooty smoke filter of the sooty smoke filter regeneration control system;
    determining whether a downhill section is included in a road on which the vehicle is to drive;
    when the amount of soot deposited is greater than or equal to a reference deposit amount and when a downhill section is included in the road on which the vehicle is to drive, controlling an engine while the vehicle drives on an uphill section, and increasing a temperature of exhaust gas flowing into the sooty smoke filter to be greater than or equal to a reference temperature;
    requesting a hybrid control unit to cause lock-up of an engine clutch and fuel-cut when the vehicle drives on the downhill section; and
    performing lock-up of the engine clutch and fuel-cut.

6. The method of claim 5, wherein, after the determining of whether a downhill section is included in the road on which the vehicle is to drive, the method further comprises:
    measuring a temperature of exhaust gas flowing into the sooty smoke filter; and
    when the measured temperature of the exhaust gas is less than or equal to the reference temperature stored in a storage unit, increasing the temperature of the exhaust gas.

7. The method of claim 5, wherein the reference temperature is a minimum reference temperature that is needed in order to regenerate the sooty smoke filter.

* * * * *